US011190734B2

(12) United States Patent
Yang et al.

(10) Patent No.: US 11,190,734 B2
(45) Date of Patent: Nov. 30, 2021

(54) MULTIWAY AUDIO-VIDEO CONFERENCING WITH MULTIPLE COMMUNICATION CHANNELS PER DEVICE

(71) Applicant: Apple Inc., Cupertino, CA (US)

(72) Inventors: Yan Yang, San Jose, CA (US); Thomas P. Devanneaux, Los Altos, CA (US); Daniel B. Pollack, San Jose, CA (US); Vu H. Chiem, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/735,584

(22) Filed: Jan. 6, 2020

(65) Prior Publication Data

US 2020/0288085 A1 Sep. 10, 2020

Related U.S. Application Data

(63) Continuation of application No. 16/145,038, filed on Sep. 27, 2018, now Pat. No. 10,531,047.

(Continued)

(51) Int. Cl.
*H04N 7/15* (2006.01)
*H04L 29/08* (2006.01)
*H04N 7/14* (2006.01)

(52) U.S. Cl.
CPC ............ *H04N 7/155* (2013.01); *H04L 67/26* (2013.01); *H04N 7/148* (2013.01); *H04N 7/152* (2013.01)

(58) Field of Classification Search
None
See application file for complete search history.

(56) References Cited

U.S. PATENT DOCUMENTS

2011/0292165 A1 12/2011 Berger
2014/0211681 A1 7/2014 Chan
(Continued)

FOREIGN PATENT DOCUMENTS

CN 102845056 12/2012
JP 2009-518996 5/2009
(Continued)

OTHER PUBLICATIONS

Korean Office Action from Korean Patent Application No. 10-2019-0039764, dated Apr. 16, 2020, 13 pages including English language translation.

(Continued)

*Primary Examiner* — Stella L. Woo
(74) *Attorney, Agent, or Firm* — Morgan, Lewis & Bockius LLP

(57) ABSTRACT

A device implementing a system for multiway audio-video conferencing includes a processor configured to receive, from a first device, indication of a first channel and a second channel for communicating content for an audio-video conference session. The first channel and the second channel correspond to different types of communication interfaces. The processor is further configured to receive, from the first device, a first request to subscribe to a first content stream for the audio-video conference session via the first channel, and to subscribe to a second content stream for the audio-video conference session via the second channel, and in response to receiving the first request, forward, to the first device, the first content stream via the first channel.

20 Claims, 13 Drawing Sheets

Related U.S. Application Data

(60) Provisional application No. 62/686,618, filed on Jun. 18, 2018, provisional application No. 62/565,910, filed on Sep. 29, 2017.

(56) References Cited

U.S. PATENT DOCUMENTS

| | | |
|---|---|---|
| 2014/0295780 A1 | 10/2014 | Amano |
| 2014/0376511 A1 | 12/2014 | Kalapatapu et al. |
| 2015/0281317 A1 | 10/2015 | Du |
| 2015/0350290 A1 | 12/2015 | Yang et al. |
| 2015/0373173 A1* | 12/2015 | Taher ............... H04M 1/2535 370/328 |
| 2017/0223599 A1 | 8/2017 | Ho |
| 2017/0237784 A1* | 8/2017 | Maistri ............ H04L 65/1083 348/14.02 |
| 2018/0054707 A1* | 2/2018 | Owen ................ H04L 65/80 |
| 2018/0132206 A1 | 5/2018 | Tan et al. |

FOREIGN PATENT DOCUMENTS

| | | |
|---|---|---|
| JP | 2012-151555 | 8/2012 |
| JP | 2014-192817 | 10/2014 |

OTHER PUBLICATIONS

Japanese Office Action from Japanese Patent Application No. 2019-100996, dated Jul. 27, 2020, 6 pages including English language translation.

European Office Action from European Patent Application No. 19167920.8, dated Aug. 19, 2020, 6 pages.

Indian Office Action from Indian Patent Application No. 201914021616, dated Nov. 2, 2020, 6 pages.

Korean Notice of Allowance from Korean Patent Application No. 10-2019-0039764, dated Nov. 26, 2020, 3 pages including English language translation.

Chinese Office Action from Chinese Patent Application No. 201910448254.2, dated Dec. 22, 2020, 10 pages including English language summary.

Chinese Office Action from Chinese Patent Application No. 201910448254.2, dated Jul. 20, 2020, 11 pages including English language translation.

Extended European Search Report from European Patent Application No. 19167920.8, dated Aug. 30, 2019, 8 pages.

European Office Action from European Patent Application No. 19167920.8, dated Mar. 5, 2021, 6 pages.

Japanese Notice of Allowance from Japanese Patent Application No. 2019-100996, dated Jan. 25, 2021, 4 pages including English language translation.

Chinese Office Action from Chinese Patent Application No. 201910448254.2, dated Apr. 20, 2021, 11 pages including English language summary.

European Office Action from European Patent Application No. 19167920.8, dated Sep. 17, 2021, 5 pages.

\* cited by examiner

MULTIWAY AUDIO-VIDEO CONFERENCING WITH MULTIPLE COMMUNICATION CHANNELS PER DEVICE

CROSS-REFERENCE TO RELATED APPLICATIONS

The present application is a continuation of U.S. patent application Ser. No. 16/145,038, filed Sep. 27, 2018, which claims the benefit of U.S. Provisional Patent Application Ser. No. 62/686,618, entitled "MULTIWAY AUDIO-VIDEO CONFERENCING WITH MULTIPLE COMMUNICATION CHANNELS PER DEVICE," filed Jun. 18, 2018, and the benefit of U.S. Provisional Patent Application Ser. No. 62/565,910, entitled "MULTI-DEVICE COMMUNICATION MANAGEMENT," filed Sep. 29, 2017, each of which is hereby incorporated herein by reference in its entirety and made part of the present U.S. Utility patent application for all purposes.

TECHNICAL FIELD

The present description relates generally to audio-video conferencing, including using multiple communication channels per device within a multiway audio-video conference session.

BACKGROUND

A user of an electronic device may participate in audio and/or video conferencing with other participants using their respective devices. Each of the participant devices have respective communication interfaces (e.g., WiFi and/or cellular), and the availability of these interfaces may change during an audio-video conference session.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
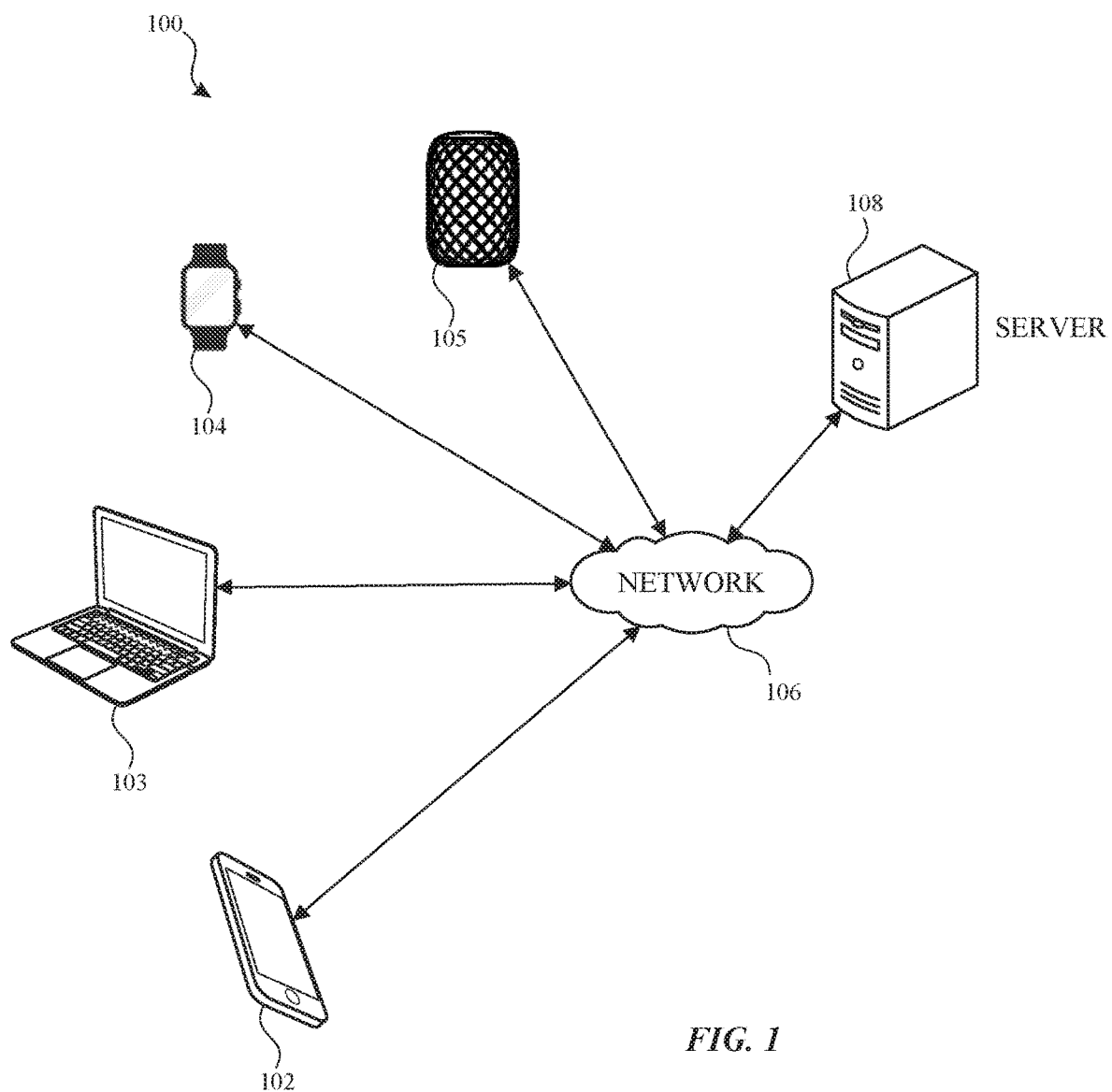
FIG. 1 illustrates an example network environment for multiway audio-video conferencing with multiple channels in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Audio-video conferencing provides for the reception and transmission of audio and/or video signals by user devices (e.g., at different locations), for communication between users in real-time. In some cases, two users may utilize audio-video conferencing to communicate with each other in one-to-one communication at their respective devices. In other cases, multiway audio-video conferencing may be utilized by more than two users to participate in a real-time, group conversation.

One or more of the participant devices may experience network connectivity loss (e.g., WiFi and/or cellular connectivity loss) during an audio-video conference session. In the one-to-one audio-video conferencing example, each of the two participant devices may both be required to renegotiate the session, for example, to account for one device switching from a WiFi interface to a cellular interface in a case where that device loses its WiFi connection. When there are more than two participants in an audio-video conference, renegotiating the sessions for each of the participant devices, due to a single participant device switching its interface, may result in a degradation of the audio-video conference experience for all of the participants.

The subject system provides for multiway audio-video conferencing in which each participant device may use separate channels (e.g., respective WiFi and cellular channels) within the same audio-video conference session, in order to transmit respective streams (e.g., a high-quality stream and a low-quality stream) to other participant devices. A participant device may provide an indication of its available streams on each channel to a server, and the server may notify the other participant devices of the available streams for that participant device. The other participant devices may subscribe to one or more of the available streams via their respective channel(s).

Thus, each participant device may publish its available streams to other participant devices, e.g., via the server, and may subscribe to receive stream(s) provided by the other participant devices, e.g., via the server. In a case where a channel becomes unavailable for a participant device, the participant device may update its subscriptions accordingly. For example, if a participant device loses its WiFi connectivity (e.g., corresponding with the WiFi channel being unavailable), and this WiFi channel was previously subscribing to one or more high-quality streams, the participant device may send an updated subscription request to the server. The updated subscription request may indicate that the WiFi channel does not subscribe to any streams, and may designate which stream(s) (e.g., high and/or low quality) to subscribe to via other channel(s) (e.g., the cellular channel).

In one or more implementations, a participant device may simultaneously subscribe to, and receive, both a high quality stream via a first communication channel, e.g., WiFi, and a low quality stream via a second communication channel, e.g., cellular. In this manner, if communication is disrupted on the first communication channel, the participant device may immediately switch over (e.g., at a key frame), to the low quality stream via the second communication channel.

FIG. 1 illustrates an example network environment for multiway audio-video conferencing with multiple channels in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, 104 and 105 (hereinafter 102-105), a network 106 and a server 108. The network 106 may communicatively (directly or indirectly) couple, for example, any two or more of the electronic devices 102-105 and the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-105 and a single server 108; however, the network environment 100 may include any number of electronic devices and any number of servers.

One or more of the electronic devices 102-105 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN (e.g., WiFi) radios, cellular radios, Bluetooth radios, Zigbee radios, near field communication (NFC) radios, and/or other wireless radios. In FIG. 1, by way of example, the electronic device 102 is depicted as a smartphone, the electronic device 103 is depicted as a laptop computer, the electronic device 104 is depicted as a smartwatch, and the electronic device 105 is depicted as a smart speaker.

The electronic devices 102-105 may be configured to participate in audio-video conferencing, for example, where the electronic devices 102-105 may participate in a group conversation in which video and/or audio content streams are transmitted between the participant devices. In the example of FIG. 1, the electronic device 105 (e.g., smart speaker) may participate with content stream(s) in audio (e.g., and not video). As discussed below with reference to FIGS. 3A-3H, each of the participant devices may be configured to publish an indication of respective available content streams for sending streaming content, and may subscribe to respective content streams for receiving streaming content. Each of the electronic devices 102-105 may be, and/or may include all or part of, the device discussed below with respect to FIG. 2, and/or the electronic system discussed below with respect to FIG. 6.

The server 108 may be, and/or may include all or part of the device discussed below with respect to FIG. 2, and/or the electronic system discussed below with respect to FIG. 6. The server 108 may include one or more servers, such as a cloud of servers, that may be used to facilitate in audio-video conferencing between the electronic devices 102-105. For explanatory purposes, a single server 108 is shown and discussed with respect to various operations, such as facilitating audio-video conferencing. However, these and other operations discussed herein may be performed by one or more servers, and each different operation may be performed by the same or different servers.

Figure 2:
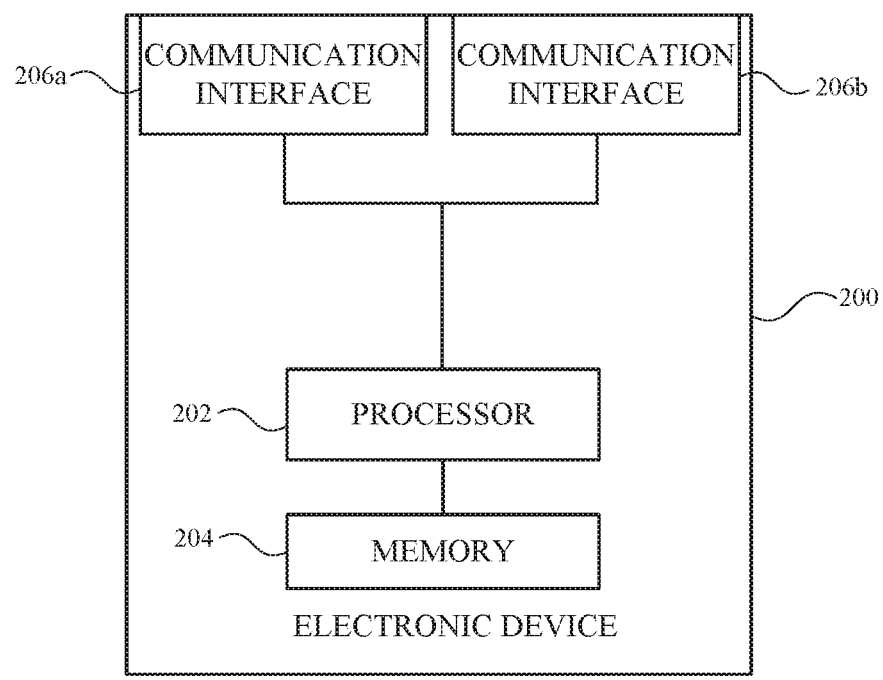
FIG. 2 illustrates an example device that may implement a system for multiway audio-video conferencing with multiple channels in accordance with one or more implementations.

FIG. 2 illustrates an example device that may implement a system for multiway audio-video conferencing with multiple channels in accordance with one or more implementations. For example, the device 200 of FIG. 2 can correspond to any of the electronic devices 102-105, or to the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, and communication interfaces 206a-206b. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200. In the subject system, the processor 202 may implement architecture(s) for audio-video conferencing with multiple channels.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one of the electronic devices 102-105, the memory 204 may store an application (e.g., an audio-video conferencing application) which is configured to facilitate using multiple channels (e.g., WiFi, cellular channels) within an audio-video conference session. In one or more implementations, the audio-video conferencing application may be part of or otherwise incorporated within the operating system of the electronic devices 102-105.

In one or more implementations, in a case where the device 200 corresponds to the server 108, the memory 204 may store one or more components configured to work in conjunction with the above-mentioned device application (e.g., the audio-video conferencing application), to facilitate in providing for audio-video conferencing between the multiple participant devices (e.g., the electronic devices 102-105).

The communication interfaces 206a-206b may include suitable logic, circuitry, and/or code that enables wired or wireless communication, such as between any of the electronic devices 102-105 and the server 108 over the network 106. In one or more implementations, the same circuitry may be used to implement the communication interfaces 206a-206b. The communication interfaces 206a-206b may include, for example, one or more of a Bluetooth communication interface, a cellular interface, an NFC interface, a Zigbee communication interface, a WLAN (e.g., WiFi, WiMAX, LiFi) communication interface, a USB communication interface, or generally any communication interface. For explanatory purposes, the device 200 is illustrated in FIG. 2 as including two communication interfaces 206a-206b; however, the device 200 may include any number of communication interfaces.

In one or more implementations, one or more of the processor 202, the memory 204, the communication interfaces 206a-206b, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

FIGS. 3A-3H illustrate an example process for using multiple channels within a multiway audio-video conference in accordance with one or more implementations. For explanatory purposes, the process 300 is primarily described herein with reference to the server 108 and the electronic devices 102-104 (depicted as "participant devices A-C") of FIG. 1. However, the process 300 is not limited to the server 108 and the electronic devices 102-104 of FIG. 1, and one or more blocks (or operations) of the process 300 may be performed by one or more other components of the server 108 and other suitable devices (e.g., any of the electronic devices 102-105). Further for explanatory purposes, the operations (e.g., 301-332) of the process 300 are described herein as occurring in serial, or linearly. However, multiple operations of the process 300 may occur in parallel. In addition, the operations of the process 300 need not be performed in the order shown and/or one or more operations of the process 300 need not be performed and/or can be replaced by other operations.

The process 300 provides for audio-video conferencing between the participant devices A-C (e.g., the electronic devices 102-104) via the server 108. The server 108 may be configured to forward audio and/or video content between the participant devices A-C, for example, via the network 106 and the respective communication interfaces 206a-206b (e.g., WiFi, cellular) of the participant devices A-C and the server 108.

Although the process 300 is illustrated and described herein with respect one or two communication interfaces (e.g., Wifi and/or cellular interfaces) per participant device, the process 300 is not limited to such, and may apply to more than two communication interfaces per participant device. In addition, the communication interfaces are not limited to Wifi and/or cellular interfaces, and may include one or more of broadband, WiMAX, LiFi, and/or other types of communication interfaces (e.g., for connecting to the Internet). In this regard, each participant device may assign separate channels (e.g., WiFi, cellular, broadband, WiMAX and/or LiFi) within the same audio-video conference session to transmit respective streams (e.g., with each stream corresponding to a different quality) to other participant devices. The participant device may provide an indication of its available streams on each channel to the server 108, and the server 108 may notify the other participant devices of the available streams (e.g., two or more) for that participant device.

As noted above, an audio-video conferencing application may be installed on each participant device. With respect to transmitting audio and/or video streams, the audio-video conferencing application (e.g., installed on the participant device A) may facilitate in transmitting streaming content to the server for subsequent receipt by other participant devices (e.g., the participant devices B-C) running respective instances of the audio-video conferencing application. With respect to receiving audio and/or video streams, the participant device A may subscribe to receive, via the server 108, content streams transmitted by the participant devices B-C.

The streaming content can correspond to audio and/or video content captured by sensors (e.g., microphones, video cameras) on each participant device, for example, corresponding to real-time video and/or audio capture of the users (e.g., faces) and/or other sights and sounds captured by the respective device. In one or more implementations, one or more of the participant devices may transmit a mesh of points captured from, and representative of, a user's face. Moreover, the streaming content may be supplemented with additional audio and/or visual data (e.g., animations, overlays, emoticons and the like), for example, in conjunction with extension applications and/or widgets associated with the audio-video conferencing application.

A user at the participant device A wishing to initiate an audio-video conference may select participant(s) via an audio-video conferencing application, and/or may initiate the audio-video conference from a different mode of communication, such as group text messaging, a group voice call, etc. For example, the participants may be selected from contacts included within a contact address book stored on the participant device A. The user may initiate the audio-video conference by selecting an appropriate user interface element provided by the audio-video conferencing application, thereby prompting the invited participants, at their respective devices (e.g., the participant devices B-C), to accept or decline participation in the audio-video conference.

When (or before) one or more of the participants have accepted the invitation (e.g., via the prompt provided by the audio-video conferencing application), the server 108 may perform an initialization procedure in which session information is published between the multiple participant devices as described herein. In one or more implementations, each of the participant devices A-C provides respective session information to the server 108, which in turn publishes the session information to the other participant devices. The session information for each device may indicate content streams and/or parity streams that are available by the device on one or more respective channels, together with respective stream identifiers for each of the content streams and each of the parity streams on each of the one or more respective channels. For each available content stream, the session information may indicate one or more parameters, including but not limited to, a maximum bit rate, an audio codec and a video resolution. In addition, the session information may indicate statistics for each content stream, including numbers of packets (e.g., transmitted and/or received), timestamps (e.g., for transmitted and/or received packets), byte statistics (e.g., transmitted and/or received), actual bit rates, sequence numbers associated with transmitted and/or received packets, and the like. By sharing the respective session information amongst the participant devices A-C, it is possible for each of the participant devices A-C to subscribe to receive a particular content stream and/or parity stream being transmitted by the other participant devices.

Figure 3A:
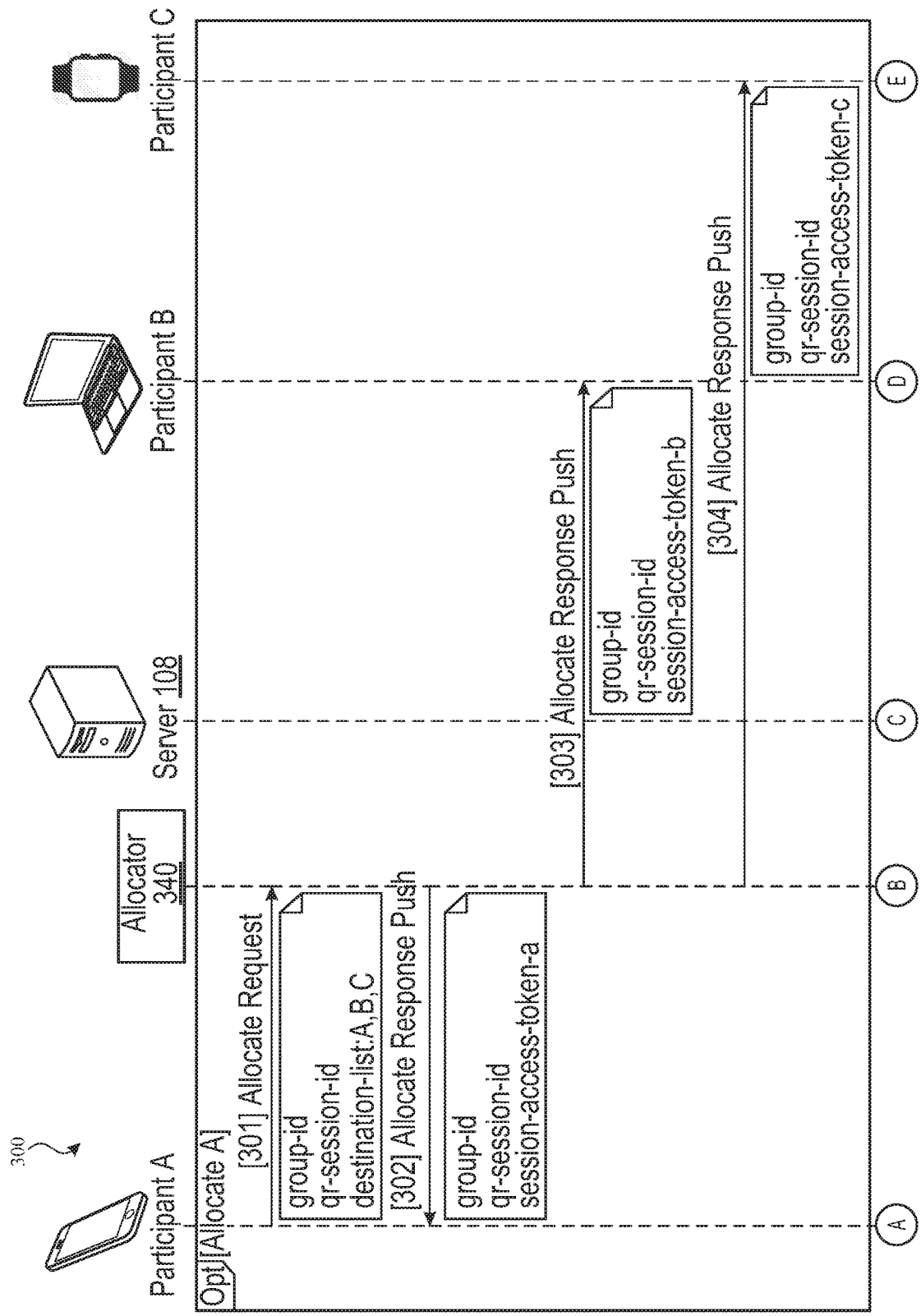
FIGS. 3A-3H illustrate an example process for using multiple channels within a multiway audio-video conference in accordance with one or more implementations.
Figure 3B:
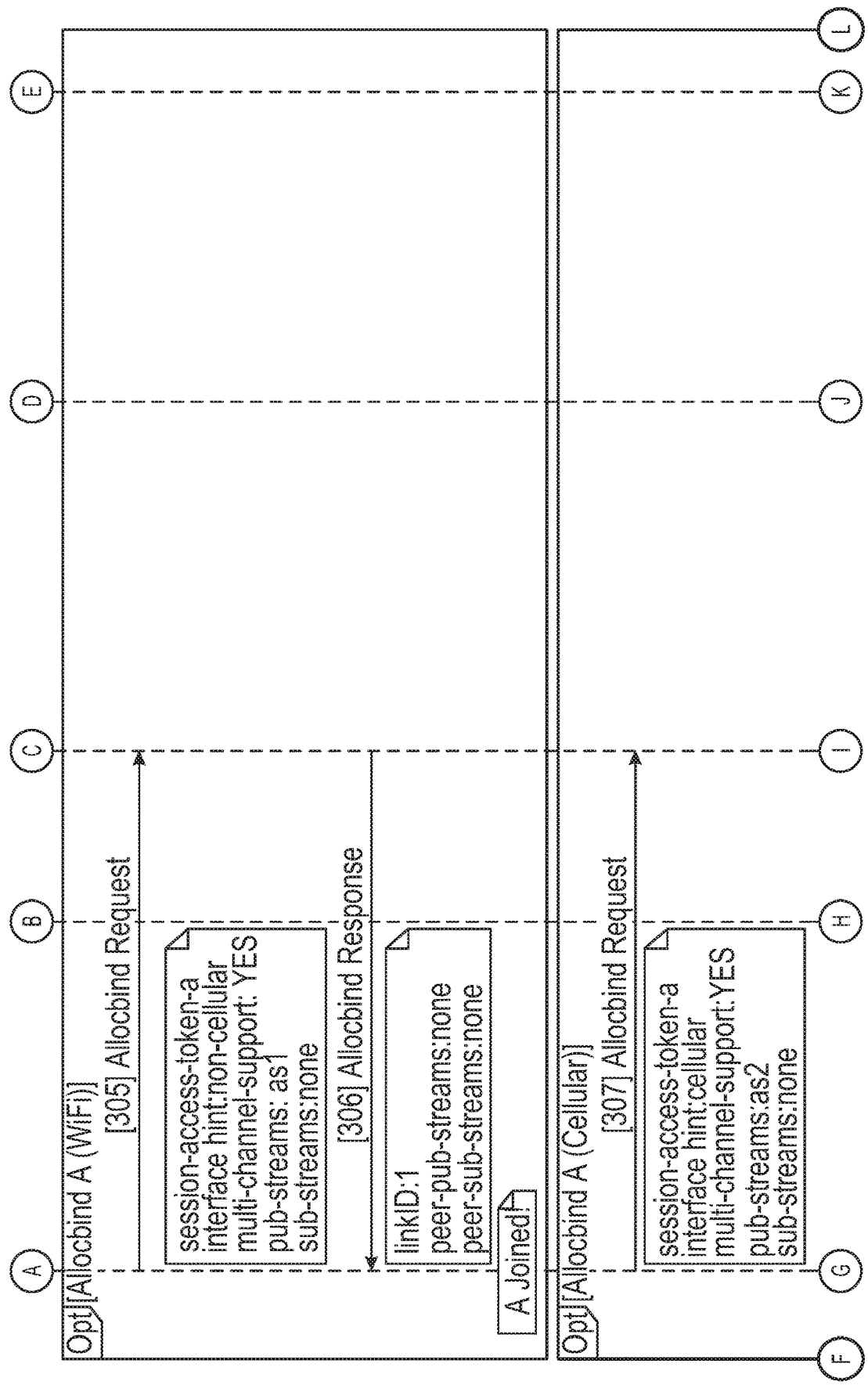
Figure 3C:
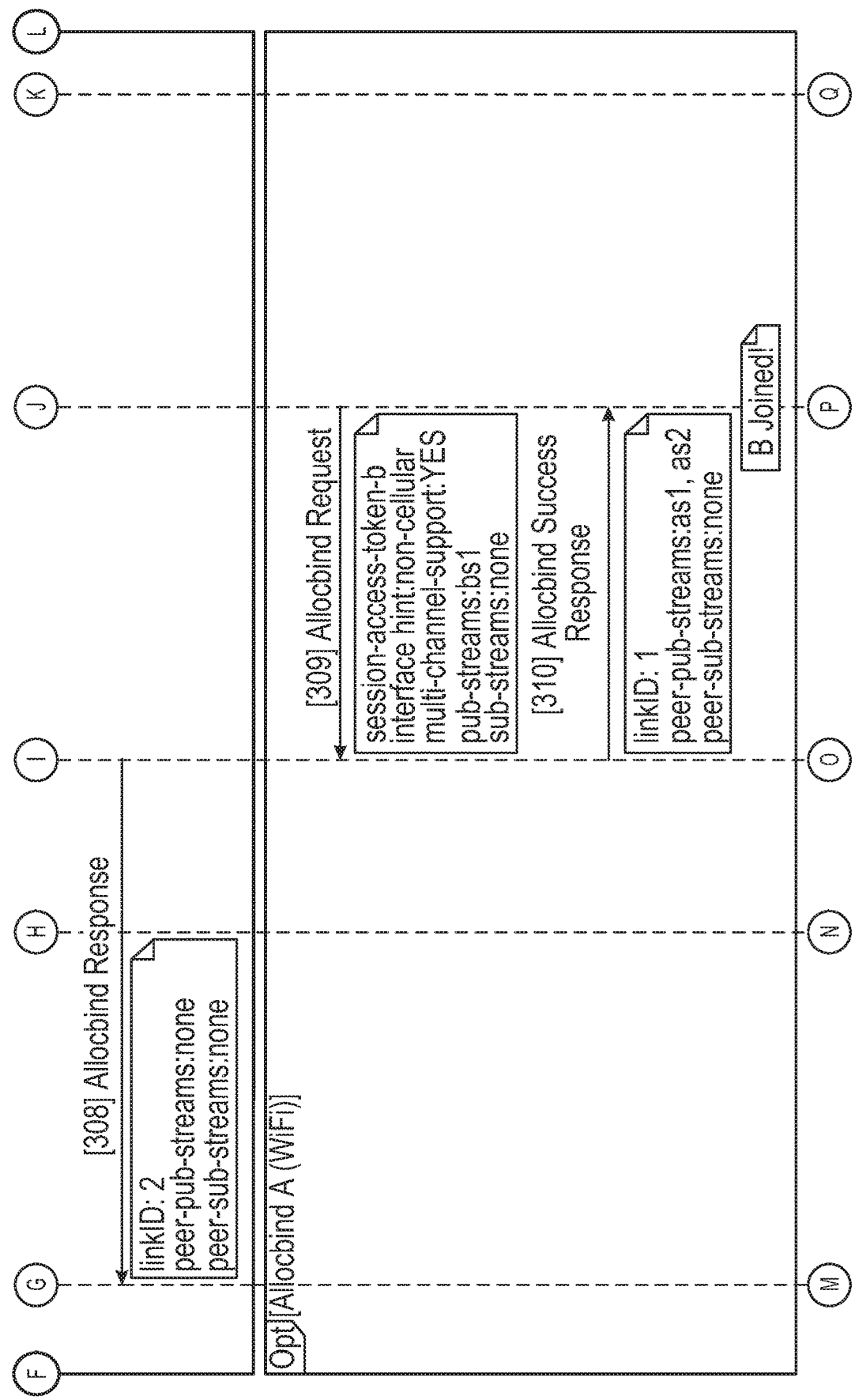
Figure 3D:
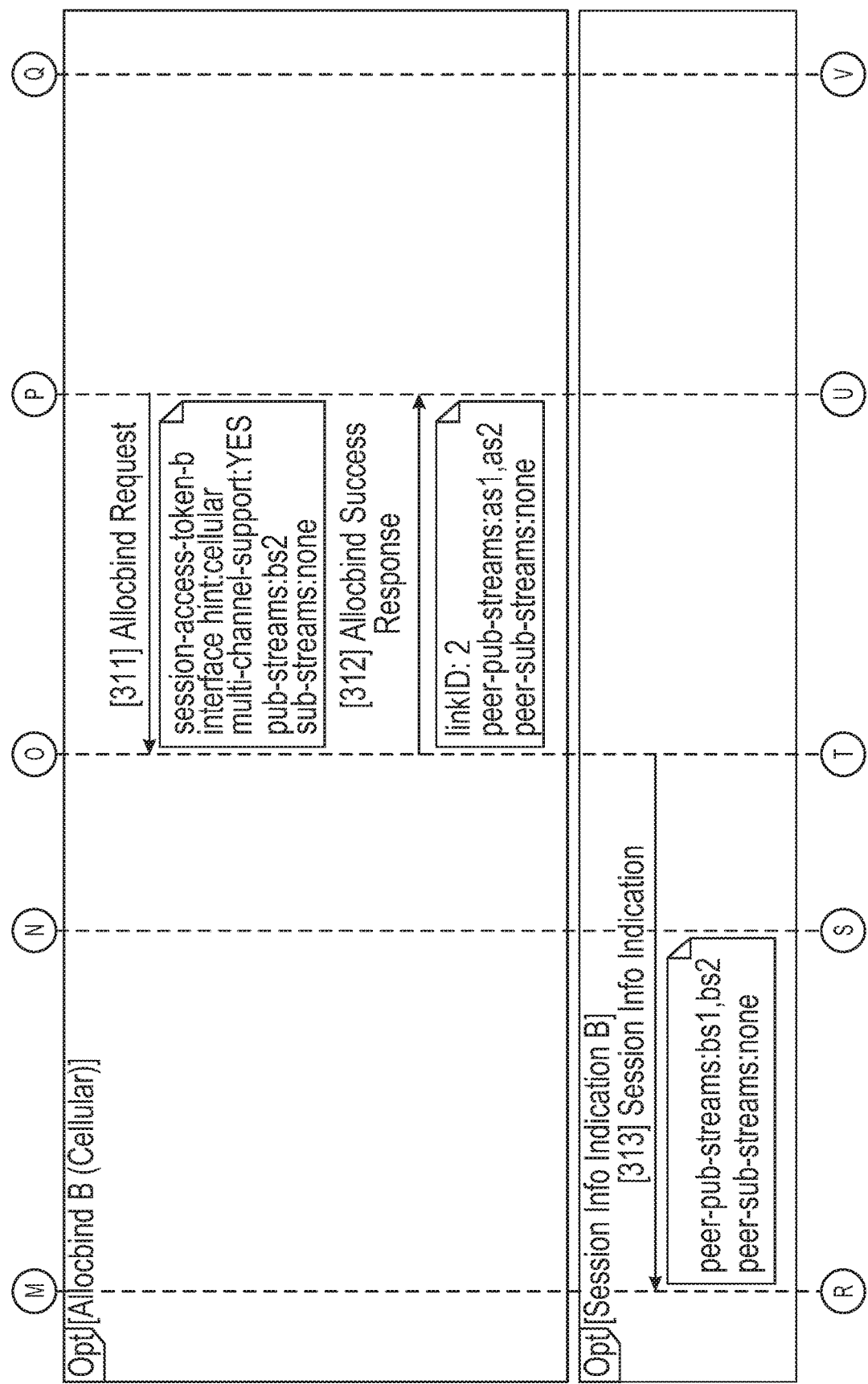
Figure 3E:
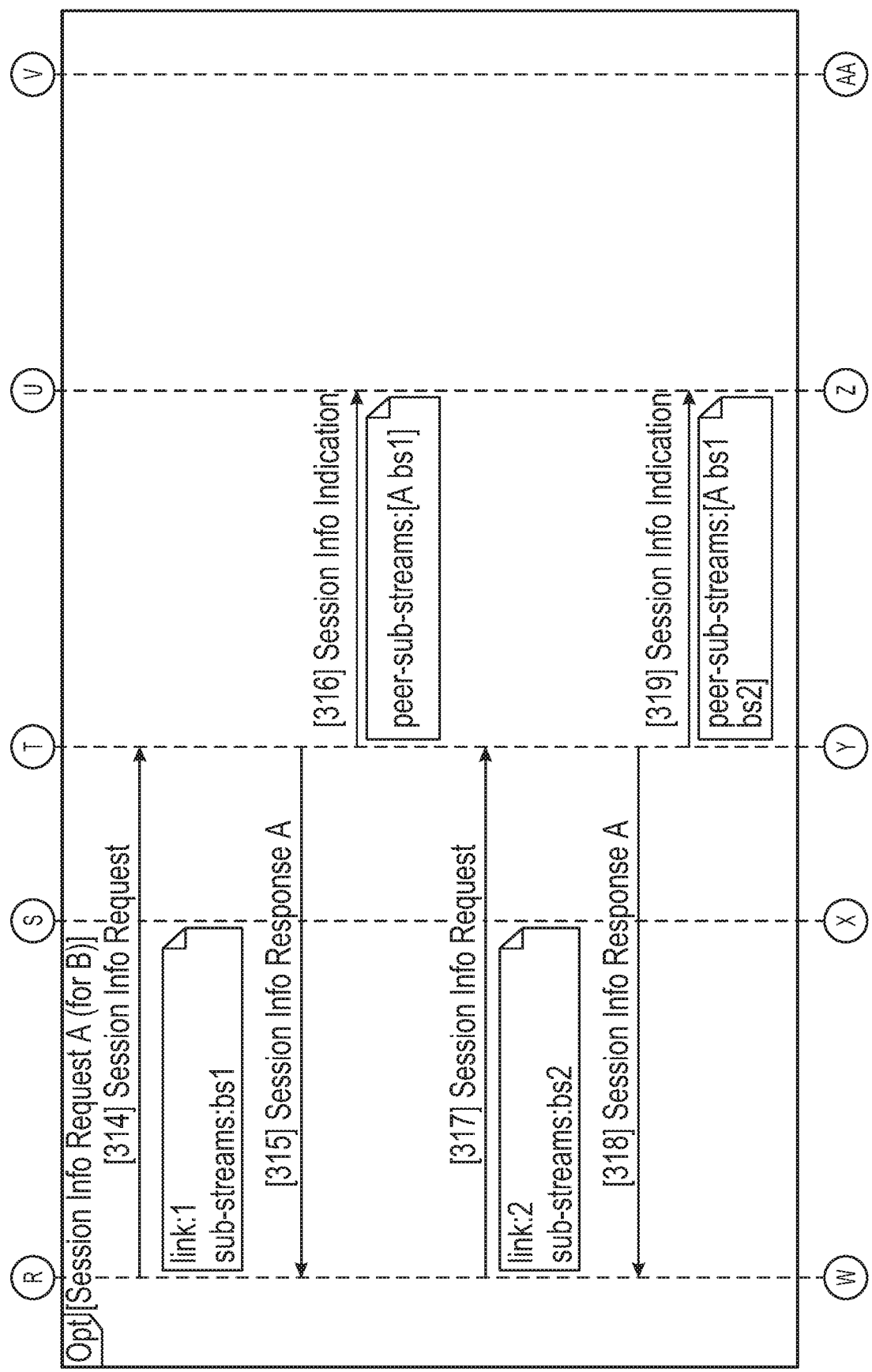
Figure 3F:
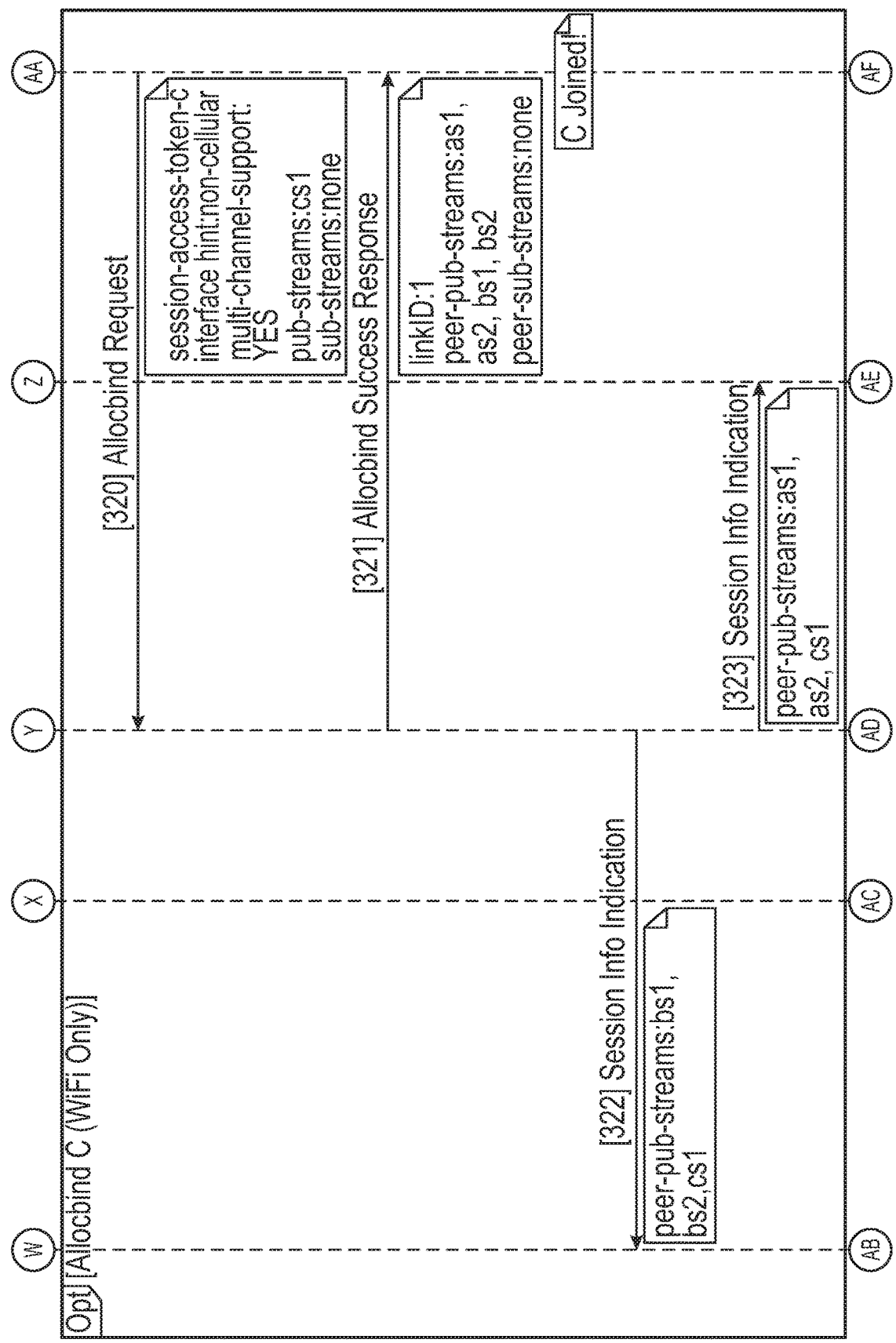
Figure 3G:
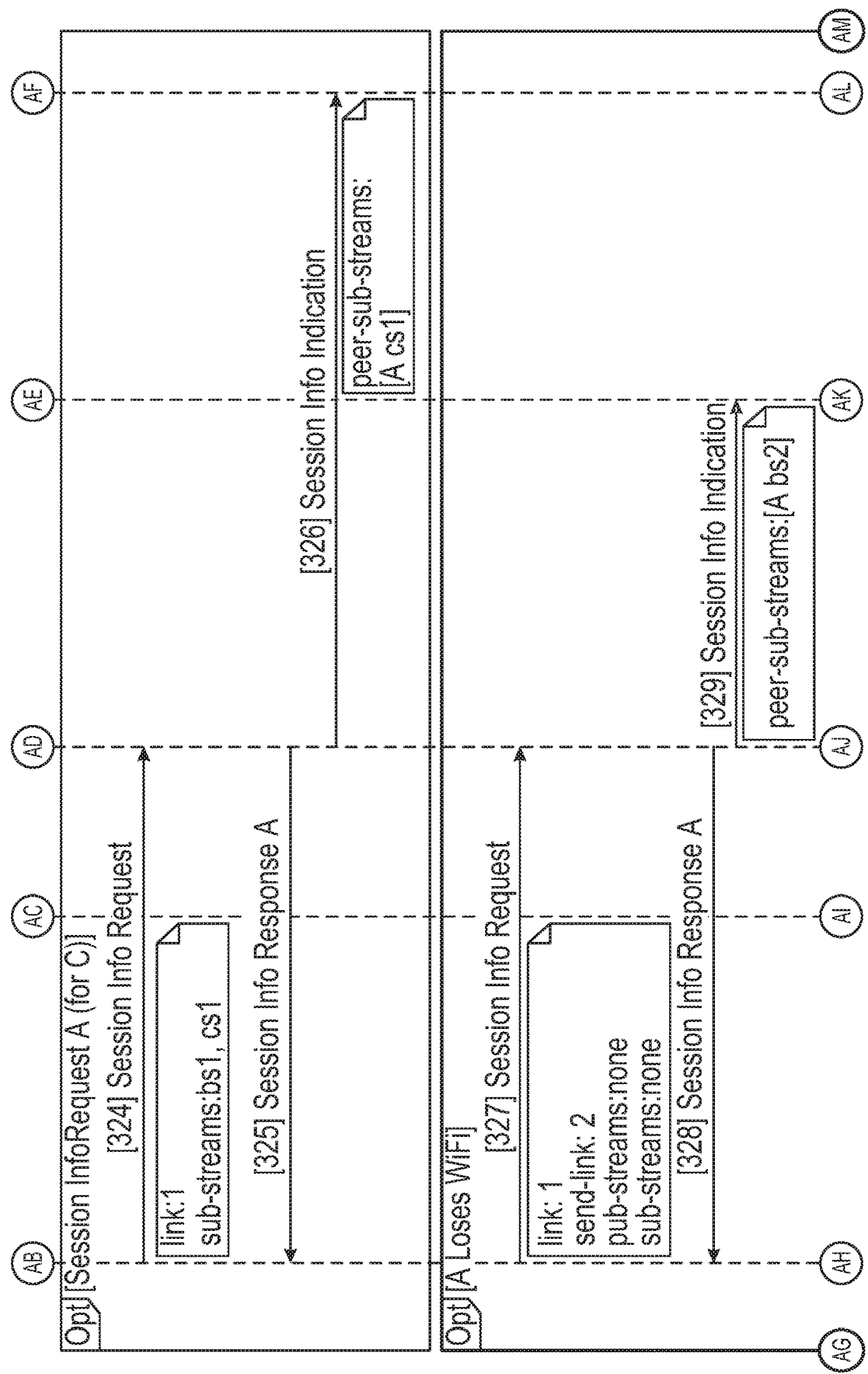
Figure 3H:
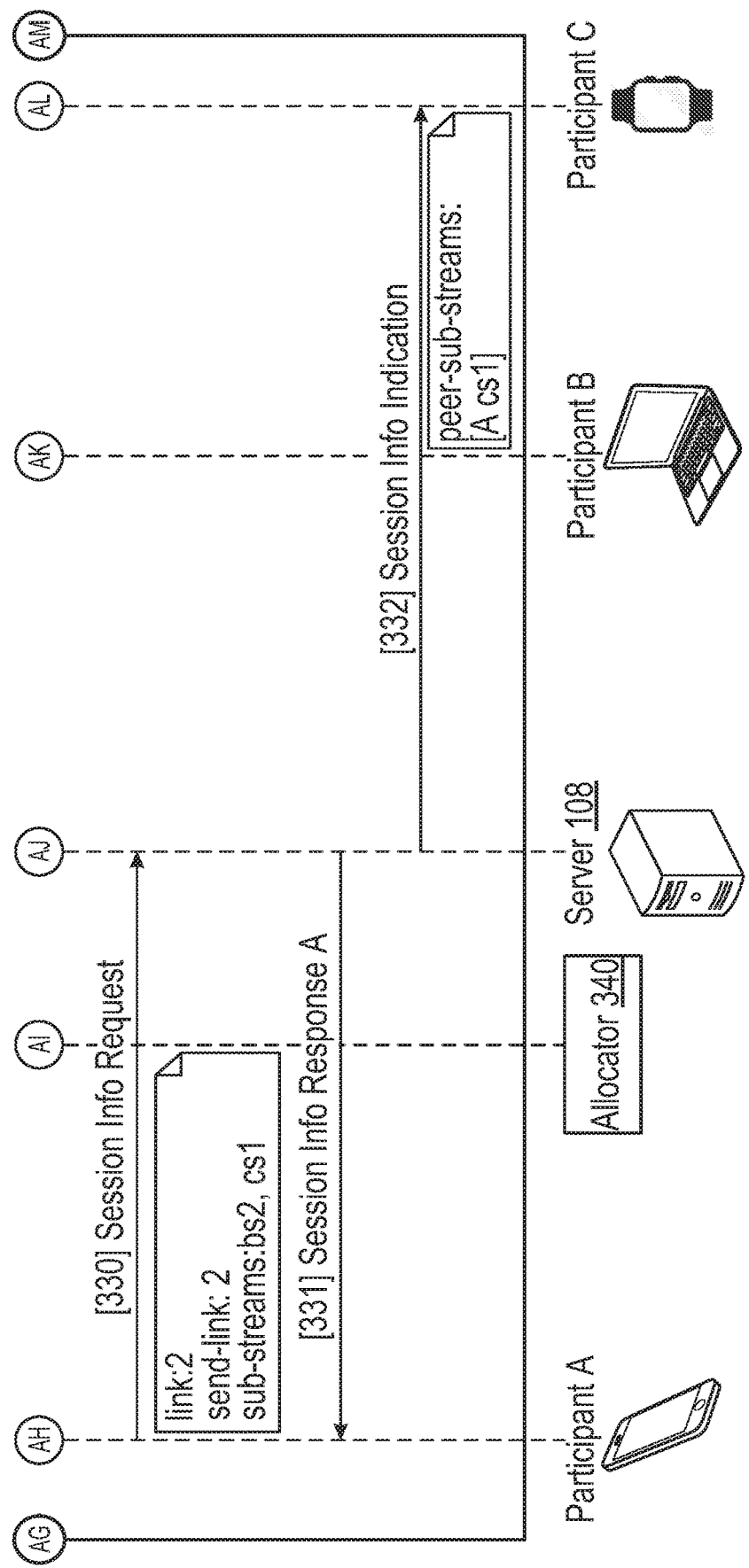

The operations 301-304 of the process 300 illustrate an example of initiating an audio-video conference between the participant devices (e.g., the participant devices A-C respectively corresponding to the electronic devices 102-104) using an allocator 340. In the example of FIG. 3A, the allocator 340 is illustrated as separate from the server 108, and may correspond, for example, to a server that is separate from the server 108. Alternatively, the allocator 340 may be wholly or partially included within and/or implemented by the server 108.

The participant device A (e.g., the electronic device 102) sends an allocate request to the allocator 340, in order to allocate an audio-video conference session (301). The allocate request may include: a group identifier (group-id); a session identifier (qr-session-id); and a destination list (e.g., participant devices A-C). In response to receiving the request, the allocator 340 may send the participant device A an allocate response push notification (302). The allocate response push notification includes: the group-id; the qr-session-id; and a session token that the allocator 340 created for the participant device A (session-access-token-a).

Since the participant device B (e.g., the electronic device 103) and the participant device C (e.g., the electronic device 104) were also indicated on the destination list, the allocator 340 sends an allocate response push notification to the participant device B (303), including: group-id; qr-session-id; and a session token created for the participant device B (session-access-token-b). In addition, the allocator 340 sends an allocate response push notification to the participant device C (304), including: group-id; qr-session-id; and a session token created for the participant device C (session-access-token-c). Based on the respective response push notifications, each of the participant devices A-C may inform the server 108 of their available stream(s) and corresponding channel(s). In one or more implementations, the received tokens may be used for end-to-end encryption of communication between the participant devices A-C (e.g., via the server 108).

In the example of FIGS. 3A-3H, the participant device A is configured to transmit two content streams, for example, a high quality stream as1 (e.g., corresponding to higher bit-rate) and a low quality stream as2 (e.g., corresponding to lower bit rate). These streams are respectively assigned, by the participant device A, to a WiFi interface and a cellular interface of the participant device A, thereby creating a WiFi channel associated with the high quality stream and a cellular channel associated with the low quality stream. The selection by the participant device A of which channel (e.g., WiFi or cellular) to associate with which stream (e.g., high or low quality) may be based one or more of the speed, bandwidth, historic reliability and/or financial cost associated with each respective channel. Thus, in one or more implementations, it is possible for the WiFi channel to instead be associated with the low quality stream while the cellular channel is associated with the high quality stream, and/or both channels may be associated with the high quality stream.

In this regard, the operations 305-306 of the process 300 illustrate an example of the participant device A informing the server 108 of the stream as1 on a WiFi channel. The participant device A sends an allocation bind request to the server 108 (305). The allocation bind request includes: session-access-token-a (e.g., where "a" represents the participant device A); a parameter indicating that the channel is WiFi (or other non-cellular channel); a parameter indicating that the participant device A supports multiple channels, for example, WiFi and cellular (multi-channel-support: YES); a parameter indicating the published stream of as1 (pub-streams: as1, e.g., a high quality stream); and a parameter indicating that there are not any streams that the participant device A has subscribed to (sub-streams: none).

In response, the server 108 sends the participant device A an allocation bind response (306). The allocation bind response includes: a link identifier for the server 108 to identify the WiFi channel (linkID: 1); an indication of streams that the participants B-C are publishing (peer-pub-streams: none, e.g., since the participant device A is the first participant); and an indication of which streams published by the participant device A are subscribed to by the participants B-C (peer-sub-streams: none, e.g., since the participant device A is the first participant). Thus, the participant device A has joined the session and can send content stream as1 to the server 108, such that streaming content can be forwarded to the other participant devices B-C once they are appropriately subscribed. Moreover, the server 108 recognizes linkID: 1 of the participant device A as a WiFi interface.

The operations 307-308 of the process 300 illustrate an example of the participant device A informing the server 108 of the stream as2 on the cellular channel of the participant device A. The participant device A sends another allocation bind request to the server 108 (307). The allocation bind request includes: session-access-token-a; a parameter indicating that the channel is cellular (interface hint: cellular); multi-channel-support: YES; a parameter indicating the published stream of as2 (pub-streams: as2, e.g., a low quality stream); and sub-streams: none.

In response, the server 108 sends the participant device A an allocation bind response (308). The allocation bind response includes: a different link identifier for the server 108 to identify the cellular channel (linkID: 2); peer-pub-streams: none; and peer-sub-streams: none. Thus, the participant device A may also send content stream as2 to the server 108, such that streaming content can be forwarded to the other participant devices B-C once they are subscribed. Moreover, the server 108 recognizes linkID: 2 of the participant device A as a cellular interface.

In the example process 300, the participant device B is configured to transmit two content streams (e.g., a high quality stream bs1 and a low quality stream bs2) via respective WiFi and cellular channels. The operations 309-310 of the process 300 illustrate an example of the participant device B informing the server 108 of the stream bs1 on the WiFi channel. The participant device B sends an allocation bind request to the server 108 (309). The allocation bind request includes: session-access-token-b; interface hint: non-cellular; multi-channel-support: YES; pub-streams: bs1 (e.g., a high quality stream); and sub-streams: none.

In response, the server 108 sends the participant device B an allocation bind response (310). The allocation bind response includes: linkID: 1 (e.g., for identification with respect to the participant device B); an indication of the streams published by other participant devices (peer-pub-streams: as1, as2); and an indication of which streams published by the participant device B are subscribed to (peer-sub-streams: none, e.g., since the participant device A has not yet subscribed).

The operations 311-312 of the process 300 illustrate an example of the participant device B informing the server 108 of the stream bs2 on the cellular channel of the participant device B. The participant device B sends an allocation bind request to the server 108 (311). The allocation bind request includes: session-access-token-b; interface hint: cellular; multi-channel-support: YES; pub-streams: bs2 (e.g., a low quality stream); and sub-streams: none.

In response, the server 108 sends the participant device B an allocation bind response (312). The allocation bind response includes: linkID: 2 (e.g., with respect to the participant device B); peer-pub-streams: as1, as2; and peer-sub-streams: none. Thus, the participant device B may send content streams bs1 and bs2 to the server 108, such that streaming content can be forwarded to the other participant devices A and/or C once subscribed. Moreover, the server 108 recognizes linkID: 1 of the participant device B as a WiFi interface and linkID: 2 of the participant device B as a cellular interface.

Thus, the server 108 is informed of the available streams provided by the participant device B. In this regard, the operation 313 of the process 300 illustrates an example of the server 108 notifying the participant device A of the change in stream settings (e.g., that content streams bs1, bs2 are being published by the participant device B). The server 108 sends the session information indication to the participant device A. The session information indication includes: peer-pub-streams: bs1, bs2; and peer-sub-streams: none.

The operations 314-319 of the process 300 illustrate an example of the participant device A subscribing to the two content streams bs1 and bs2. As noted above, the participant device A has two channels (e.g., WiFi and cellular). In addition, the participant device A was notified by the server 108 of the bs1 (e.g., high quality, per the session information) and bs2 (e.g., low quality, per the session information) streams. The participant device A sends a session information request to the server 108 (314). The session information request includes: an indication of the WiFi channel of the participant device A (link 1); and an indication of the stream to subscribe to (bs1).

In response, the server 108 sends a session information response to the participant device A (315), confirming that the participant device A has subscribed to the content stream bs1 via the WiFi channel. In addition, the server 108 sends an indication to the participant device B (316), to notify the participant device B that the participant device A has subscribed to the content stream bs1 (peer-sub-streams: A bs1). In one or more implementations, the participant device B is not notified that the content stream bs1 is associated with the WiFi channel of the participant device A.

In addition, the participant device A may subscribe to the content stream bs2. Thus, the participant device A sends a session information request to the server 108 (317), which includes: link 2 (e.g., cellular channel); and sub-streams: bs2 (e.g., subscribing to the low quality stream). In response, the server 108 sends a session information response to the participant device A (318), confirming that the participant device A has subscribed to the content stream bs2. In addition, the server 108 sends an indication to the participant device B (316), to notify the participant device B that the participant device A has subscribed to the content stream bs2 (peer-sub-streams: A bs2), without necessarily notifying the participant device B that the content stream bs2 is associated with the cellular channel of the participant device A.

Thus, the participant device A is subscribed to both of content streams bs1 and bs2. In one or more implementations, while the participant device A is capable of receiving both of the content streams bs1 and bs2, the participant device A may choose which stream to receive. For example, since the content stream bs1 may be of higher quality, the participant device A may select to receive this stream. However, if any problems are encountered with respect to this stream (e.g., a lost connection for the channel, or detection of a predefined amount of bandwidth degradation and/or packet loss), the participant device A may be configured to switch from the content stream bs1 to the content stream bs2.

In the example of process 300, the participant device C is configured to transmit one content stream (e.g., a high quality stream cs1) via a respective WiFi channel. The operations 320-323 of the process 300 illustrate an example of the participant device C informing the server 108 of the stream cs1 on the WiFi channel. The participant device C sends an allocation bind request to the server 108 (320). The allocation bind request includes: session-access-token-c; interface hint: non-cellular; multi-channel-support: YES; pub-streams: cs1 (e.g., a high quality stream); and sub-streams: none.

In response, the server 108 sends the participant device C an allocation bind response (321). The allocation bind response includes: linkID: 1 (e.g., with respect to the participant device C); peer-pub-streams: as1, as2, bs1, bs2; and peer-sub-streams: none (e.g., since the participants devices A and B have not yet subscribed). The server 108 at the operation 322 notifies the participant device A of the change of stream settings, by sending the following session information indication to the participant device A: peer-pub-streams: bs1, bs2, cs1. In addition, the server 108 at the operation 323 notifies the participant device B of the change of stream settings, by sending the following session information indication to the participant device B: peer-pub-streams: as1, as2, cs1.

The operations 324-326 of the process 300 illustrate an example of the participant device A subscribing to the content stream cs1. The participant device A sends a session information request to the server 108 (324), which includes: link 1; and sub-streams: bs1, cs1 (e.g., high quality streams). In response, the server 108 sends a session information response to the participant device A (325), confirming that the participant device A has subscribed to the content streams bs1 and cs1. In addition, the server 108 sends an indication to the participant device C (326), to notify the participant device C that the participant device A has subscribed to the content stream cs1 (peer-sub-streams: A cs1).

The operations 327-332 of the process 300 illustrate an example of the participant device A's WiFi interface becoming unavailable (e.g., due to a lost connection, or due to detecting a predefined amount of packet loss and/or degradation). Since the WiFi interface is unavailable, the participant device A may send data via its remaining communication interface(s) (e.g., the cellular interface). Thus, the participant device A sends, via its cellular channel, a session information request to the server 108 (327) specifying that the WiFi link will not publish or subscribe to any content stream. The session information request includes: an indication of the WiFi channel (link: 1); an indication that the cellular channel is sending the request (send-link: 2, e.g., for illustrative purposes with respect to FIG. 3G); pub-streams: none; and sub-streams: none.

In response, the server 108 sends a session information response to the participant device A (328), confirming the updated subscription settings for the participant device A. In addition, the server 108 sends a session information indication to the participant device B (329), for example, since the participant device A had previously subscribed to content stream bs1. The session information indication may indicate that the participant device A now only subscribes to the content stream bs2 (peer-sub-streams: A bs2). Although not shown in the operation 329, the session information indication may further indicate peer-pub-streams: as2 (e.g., and no longer as1), so as to notify the participant device B of the participant device A's updated published stream information (e.g., that stream as1 is no longer available, in case the participant device B is subscribed thereto).

Since the participant device A's WiFi channel is lost, the participant device A would no longer receive any stream from the participant device C based on current subscription settings (e.g., the participant device C only published a single content stream cs1, associated with the WiFi channel of the participant device A). To receive the content stream cs1, the participant device A sends, via its cellular channel, a session information request to the server 108 (330) specifying that the cellular link will subscribe to the content stream cs1. The session information request includes: an indication of the cellular channel (link: 2); an indication that the cellular channel is sending the request (send-link: 2, e.g., for illustrative purposes with respect to FIG. 3H); and sub-streams: bs2, cs1.

In response, the server 108 sends a session information response to the participant device A (328), confirming the updated subscription settings for the participant device A. In addition, the server 108 sends a session information indication to the participant device C (332). The session information indication indicates that the participant device A subscribes to the content stream bs2 (peer-sub-streams: A cs1). Although not shown in the operation 332, the session information indication may further indicate peer-pub-streams: as2 (e.g., and no longer as1), so as to notify the participant device C of the participant device A's updated published stream information (e.g., that stream as1 is no longer available).

In one or more implementations (not shown), if the participant device A were to regain its WiFi channel, the participant device A may send an allocation bind request to the server 108 (e.g., indicating pub-streams: as1; sub-streams: bs1,cs1). In response, the server 108 may send an allocation bind response to the participant device A (e.g., indicating linkID: 1; peer-pub-streams: bs1,cs1).

In one or more implementations, the server 108 may store a data structure (e.g., a table) of the different channels (e.g., WiFi, cellular and/or the like) that are available at any given time for each of the participant devices A-C. The data structure may also store the respective stream(s) associated with each of the different channels. The server 108 may update this data structure upon receiving updates (e.g., subscription updates, available stream updates) from one or more of the participant devices A-C.

In one or more implementations, it is possible for a particular content stream to be published on multiple channels of a participant device. For example, the content stream as1 (e.g., high quality) may be made available by the WiFi channel and the cellular channel of the participant device A. However, the participant device A may be configured to not send duplicate streams, such that the content stream as1 is made available on one of the WiFi channel or the cellular channel, but not on both channels.

Figure 4:
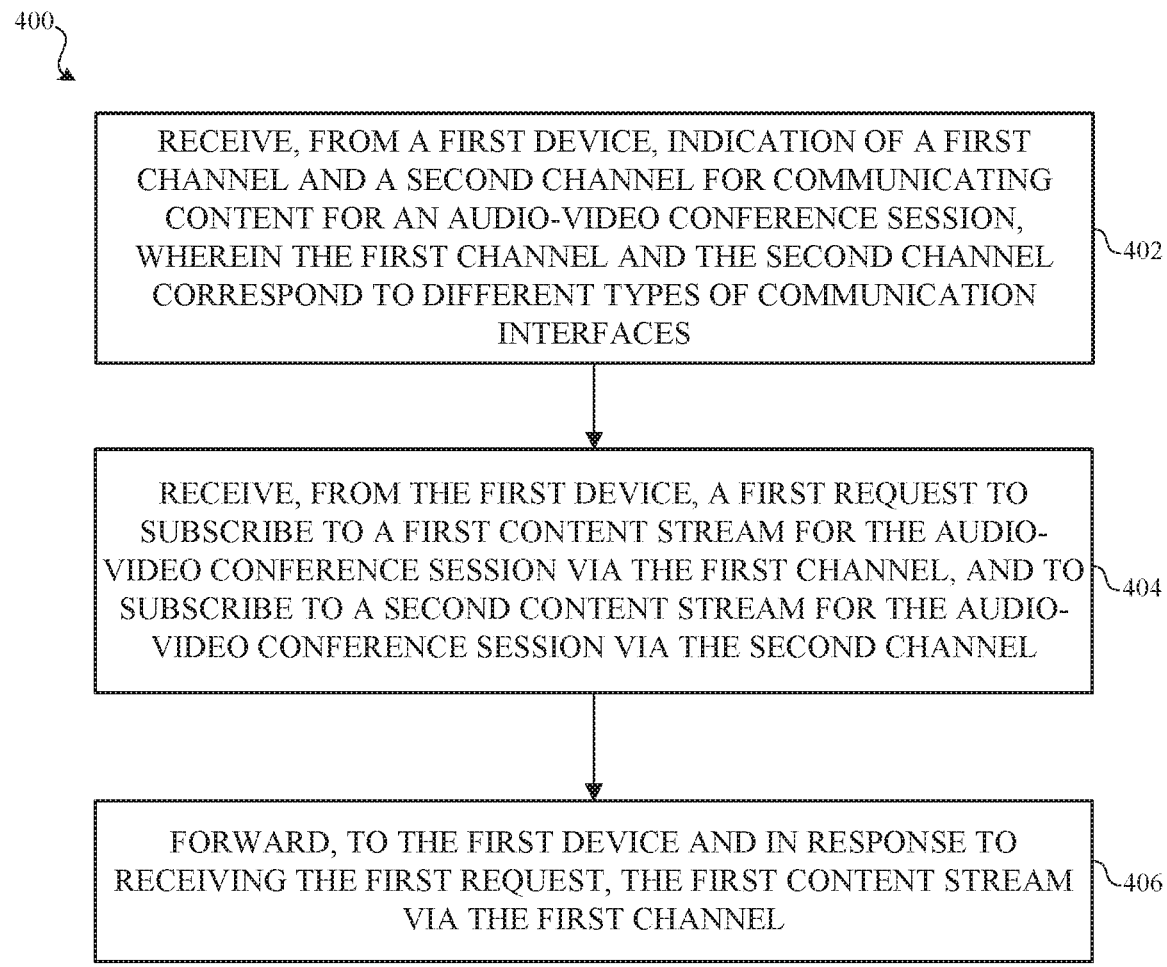
FIG. 4 illustrates a flow diagram of an example process by a server for using multiple channels within a multiway audio-video conference in accordance with one or more implementations.

FIG. 4 illustrates a flow diagram of an example process by a server for using multiple channels within a multiway audio-video conference in accordance with one or more implementations. For explanatory purposes, the process 400 is primarily described herein with reference to the server 108 and the electronic devices 102-103 of FIG. 1. However, the process 400 is not limited to the server 108 and the electronic devices 102-103 of FIG. 1, and one or more blocks (or operations) of the process 400 may be performed by one or more other components of the server 108 and by other suitable devices (e.g., any of the electronic devices 102-105). Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The server 108 receives, from a first device (e.g., the electronic device 102), indication of a first channel and a second channel for communicating content for an audio-video conference session (402). The first channel and the second channel correspond to different types of communication interfaces.

The server 108 receives, from the electronic device 102, a first request to subscribe to a first content stream for the audio-video conference session via the first channel, and to subscribe to a second content stream for the audio-video conference session via the second channel (404). For example, the server 108 may receive, from a second device (e.g., the electronic device 103), indication of the first content stream and the second content stream available by the electronic device 103.

The server 108 forwards, to the electronic device 102 and in response to receiving the first request, the first content stream via the first channel (406). The server 108 may send, to the electronic device 103, an indication that the electronic device 102 has subscribed to the first content stream and to the second content stream.

The server 108 may receive, from the electronic device 102, a second request to unsubscribe from the first content stream via the first channel. The server 108 may send, to the electronic device 103 and in response to receiving the second request, an indication that the electronic device 102 does not subscribe to the first content stream. Receiving the second request may be based on the first channel becoming unavailable on the electronic device 102. The second request may be received from the second channel of the electronic device 102. The server 108 may forward, to the electronic device 102, the second content stream via the second channel based on the electronic device 102 having previously subscribed to the second content stream via the second channel.

The server 108 may receive, from the electronic device 102, a third request to re-subscribe to the first content stream via the first channel, based on the first channel becoming available on the electronic device 102. The server 108 may send, to the electronic device 103 and in response to receiving the third request, an indication that the electronic device 102 has subscribed to the first content stream.

The server 108 may receive, from a third device (e.g., the electronic device 104), indication of a third content stream available by the electronic device 104. The server 108 may receive, from the electronic device 102, a second request to subscribe to the third content stream via the first channel. The server 108 may, in response to receiving the second request, send, to the electronic device 104, an indication that the electronic device 102 has subscribed to the third content stream, and forward, to the electronic device 102, the third content stream via the first channel. The server 108 may receive, from the second channel of the electronic device 102, a third request to unsubscribe from the third content stream via the first channel, and to subscribe to the third content stream via the second channel, based on the first channel becoming unavailable on the electronic device 102.

The server 108 may receive, from the electronic device 102, indication of a third content stream and a fourth content stream available by the electronic device 102. The third content stream and the fourth content stream may correspond to different bit rates of streaming content.

Figure 5:
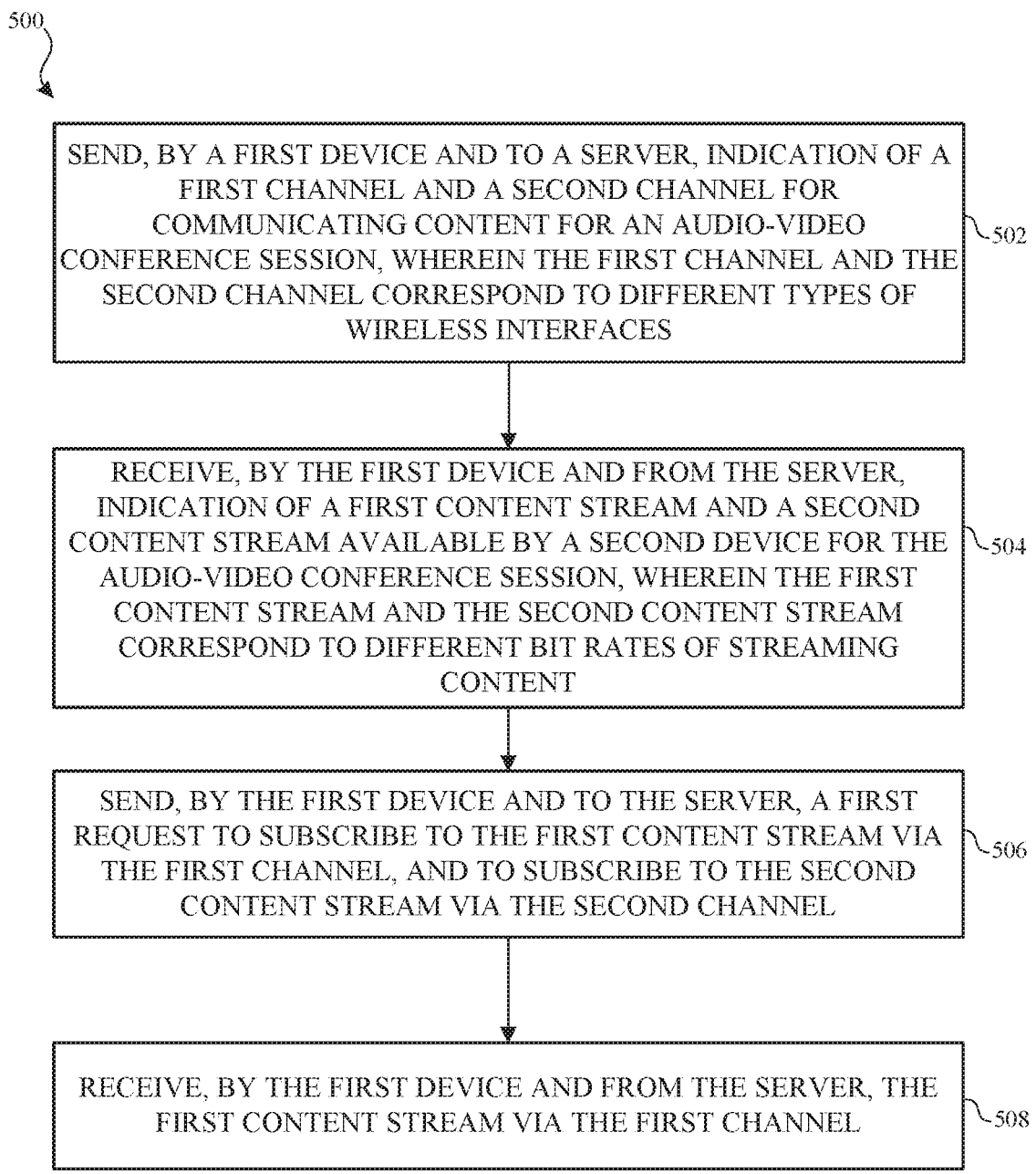
FIG. 5 illustrates a flow diagram of an example process by a participant device for using multiple channels within a multiway audio-video conference in accordance with one or more implementations.

FIG. 5 illustrates a flow diagram of an example process by a participant device for using multiple channels within a multiway audio-video conference in accordance with one or more implementations. For explanatory purposes, the process 500 is primarily described herein with reference to the electronic devices 102-103 and the server 108 of FIG. 1. However, the process 500 is not limited to the electronic devices 102-103 and the server 108 of FIG. 1, and one or more blocks (or operations) of the process 500 may be performed by one or more other components of the electronic devices 102-103 or the server 108, or by other suitable devices (e.g., any of the electronic devices 102-105). Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

A first device (e.g., the electronic device 102) sends, to the server 108, indication of a first channel and a second channel for communicating content for an audio-video conference session (502). The first channel and the second channel correspond to different types of wireless interfaces (e.g., WiFi, cellular).

The electronic device 102 receives, from the server 108, an indication of a first content stream and a second content stream available by a second device (e.g., the electronic device 103) for the audio-video conference session (504). The first content stream and the second content stream correspond to different bit rates of streaming content.

The electronic device 102 sends, to the server 108, a first request to subscribe to the first content stream via the first channel, and to subscribe to the second content stream via the second channel (506). The electronic device 102 receives, from the server 108, the first content stream via the first channel (508).

The electronic device 102 may send, to the server 108, a second request to unsubscribe from the first content stream via the first channel. The server 108 may be configured to send, to the electronic device 103, an indication that the electronic device 102 does not subscribe to the first content stream. The electronic device 102 may receive, from the server 108, the second content stream via the second channel based on the first device having been previously subscribed to the second content stream via the second channel.

In one or more implementations, sending the second request may be based on the first channel becoming unavailable on the electronic device 102. The second request may be sent from the second channel of the electronic device 102. The electronic device 102 may send, to the server 108, a third request to re-subscribe to the first content stream via the first channel, based on the first channel becoming available on the electronic device 102. The server 108 may be configured to send, to the electronic device 103, an indication that the electronic device 102 has subscribed to the first content stream.

The electronic device 102 may send, to the server 108, indication of a third content stream and a fourth content stream available by the electronic device 102. The third content stream and the fourth content stream may correspond to different bit rates of streaming content.

The electronic device 102 may send, to the server 108, a second request to subscribe to a third content stream via the first channel. The third content stream may be provided by a third device (e.g., the electronic device 104). The electronic device 102 may receive, from the server 108, the third content stream via the first channel in response to sending the second request. The electronic device 102 may send, to the server 108, a third request to unsubscribe from the third content stream via the first channel, and to subscribe to the third content stream via the second channel, based on the first channel becoming unavailable on the electronic device 102.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 6:
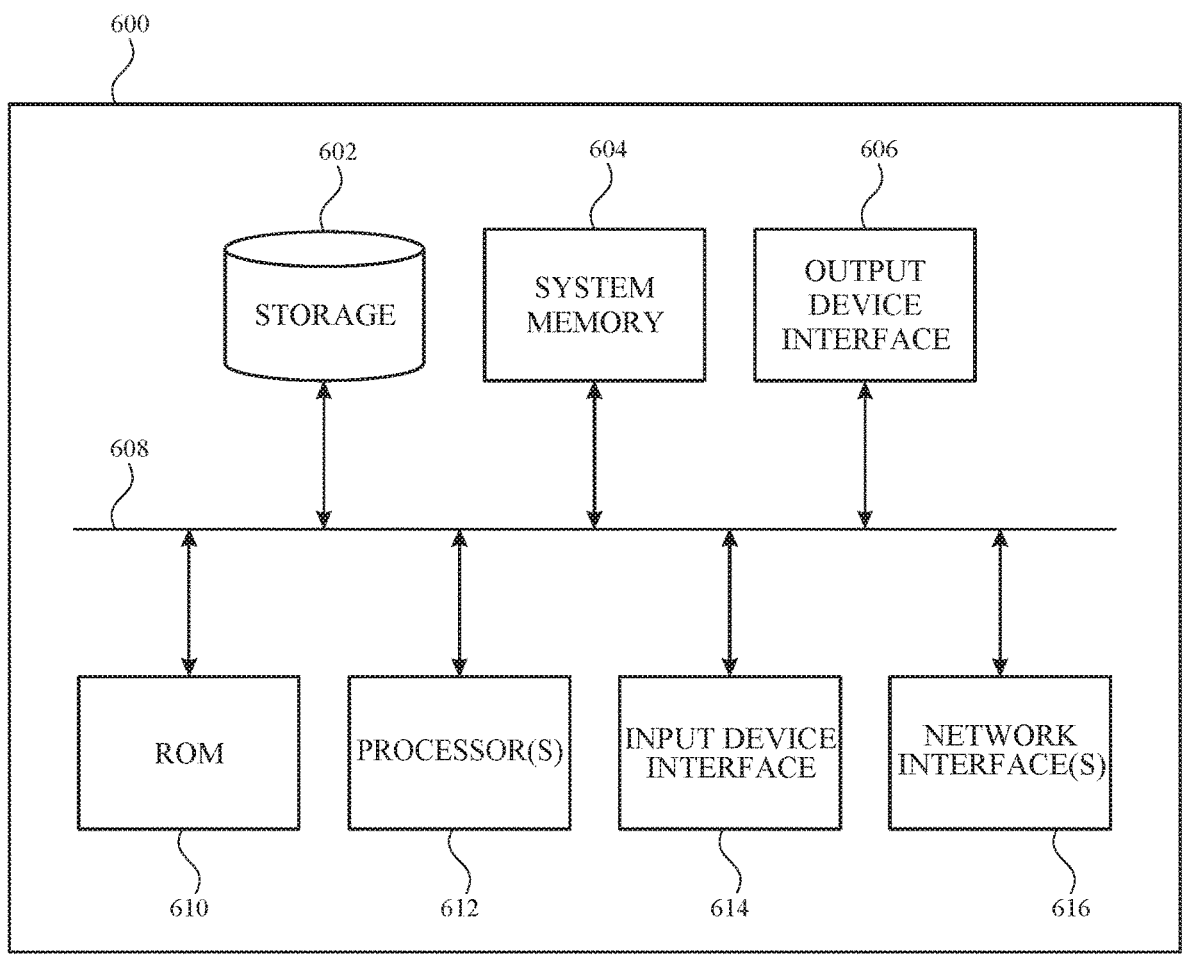
FIG. 6 illustrates an example electronic system with which aspects of the subject technology may be implemented in accordance with one or more implementations.

FIG. 6 illustrates an electronic system 600 with which one or more implementations of the subject technology may be implemented. The electronic system 600 can be, and/or can be a part of, one or more of the electronic devices 102-105, and/or one or the server 108 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, such as the server 108 shown in FIG. 1, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

We claim:

1. A method comprising:
receiving, by an electronic device, a request to initiate an audio-video conference session with a plurality of participants;
responsive to receiving the request, providing, for transmission to a server, a request to allocate the audio-video conference session, wherein the request comprises a respective identifier of at least one of the plurality of participants;
receiving, from the server and responsive to the at least one of the plurality of participants joining the audio-video conference session, an indication of a first content stream and a second content stream available from another electronic device corresponding to the at least one of the plurality of participants, the first and second content streams corresponding to different bit rates of streaming content for the audio-video conference session; and
providing, for transmission to the server and prior to receipt of any of the first and second content streams, a request to receive the first content stream for the at least one of the plurality of participants of the audio-video conference session when the first content stream is available, and to receive the second content stream for the at least one of the plurality of participants when the first content stream is unavailable.

2. The method of claim 1, further comprising:
receiving, from the server, an allocation response that comprises access information for the audio-video conference session; and
providing, for transmission to the server, the access information in conjunction with a first indication of a third content stream available from the electronic device for the audio-video conference session via a first communication interface and a second indication of whether the electronic device is configured to provide a fourth content stream for the audio-video conference session via a second communication interface, the first and second content streams corresponding to different bit rates of another streaming content for the audio-video conference session.

3. The method of claim 1, wherein, the request is received by the electronic device via an another application used for a different mode of communication other than audio-video conferencing.

4. The method of claim 3, further comprising:
receiving, from the server, the first content stream; and
displaying, via an audio-video conferencing application, the first content stream for the audio-video conference session.

5. The method of claim 4, further comprising:
receiving, from the server, the second content stream in place of the first content stream; and
switching from displaying the first content stream to displaying the second content stream responsive to receiving the second content stream in place of the first content stream.

6. The method of claim 5, wherein the switching is performed at a key frame of the first content stream.

7. The method of claim 5, wherein the first content stream has a higher bit rate than the second content stream.

8. A device comprising:
a memory; and
at least one processor configured to:
receive, from a server and via an audio-video conference application, an invitation to participate in an audio-video conference session having a plurality of participants;
display, by the audio-video conference application, a prompt for accepting the invitation responsive to receipt of the invitation;
responsive to receipt of an acceptance of the invitation by the audio-video conference application, provide, for transmission to the server, a first indication of a first content stream available for the audio-video conference session via a first communication interface and a second indication of whether the device is configured to provide a second content stream for the audio-video conference session over a second communication interface, the first and second content streams corresponding to different bit rates of streaming content for the audio-video conference session; and
provide, for transmission to the server via the first communication interface, the first content stream for the audio-video conference session.

9. The device of claim 8, wherein the at least one processor is further configured to:
when the second indication indicates that the device supports providing the second content stream for the audio-video conference session over the second communication interface, provide, for transmission to the server via the second communication interface, the second content stream for the audio-video conference session.

10. The device of claim 9, wherein the at least one processor is further configured to:
concurrently provide, for transmission to the server, the first content stream via the first communication interface and the second content stream via the second communication interface.

11. The device of claim 8, wherein the at least one processor is further configured to:
receive, from the server, a third content stream for the audio-video conference session, the third content stream corresponding to one of the plurality of participants; and
display the third content stream for the audio-video conference session.

12. The device of claim 11, wherein the at least one processor is further configured to:
receive, from the server, a fourth content stream for the audio-video conference session, the fourth content stream corresponding to the one of the plurality of participants, and the third and fourth content streams corresponding to different bit rates of other streaming content for the audio-video conference session.

13. The device of claim 12, wherein the at least one processor is further configured to:
concurrently receive, from the server, the third and fourth content streams.

14. The device of claim 13, wherein the at least one processor is configured to:
switch from displaying the third content stream to displaying the fourth content stream for the audio-video conference session responsive to detecting a threshold amount of packet loss corresponding to the third content stream, wherein the fourth content stream has a lower bit rate than the third content stream.

15. The device of claim 12, wherein each of the third and fourth content streams correspond to a same streaming content.

16. A non-transitory machine readable medium comprising code that, when executed by one or more processors causes the one or more processors to perform operations, the code comprising:
code to receive, from a first electronic device associated with a first user, a request to initiate an audio-video conference session with a second user associated with a second electronic device and a third user associated with a third electronic device;
code to transmit respective access information for the audio-video conference session to the first, second, and third electronic devices, the respective access information being different for each of the first, second, and third electronic devices;
code to receive, from the first, second, and third electronic devices, the respective access information and respective indications of content streams available from each of the first, second, and third electronic devices for the audio-video conference session; and
code to transmit session information for the audio-video conference session to the first, second, and third electronic devices, the session information indicating the content streams available from the first, second, and third electronic devices for the audio-video conference session.

17. The non-transitory machine readable medium of claim 16, wherein the code further comprises:
code to receive, from the first electronic device, a request to receive a first content stream corresponding to the second electronic device when the first content stream is available, and to receive a second content stream corresponding to the second electronic device when the first content stream is unavailable;
code to receive, from the second electronic device, the first content stream; and
code to transmit, to the first electronic device, the first content stream.

18. The non-transitory machine readable medium of claim 17, wherein the code further comprises:
code to receive, from the second electronic device, the second content stream concurrently with the first content stream;
code to determine that the first content stream has become unavailable; and
code to transmit, to the first electronic device, the second content stream in place of the first content stream.

19. The non-transitory machine readable medium of claim 18, wherein the first and second content streams correspond to different bit rates.

20. The non-transitory machine readable medium of claim 16, wherein the code further comprises:
code to receive, from the first electronic device, another indication of whether the first electronic device is configured to transmit content streams for the audio-video conference session over multiple communication interfaces.

* * * * *